Figure 1A:
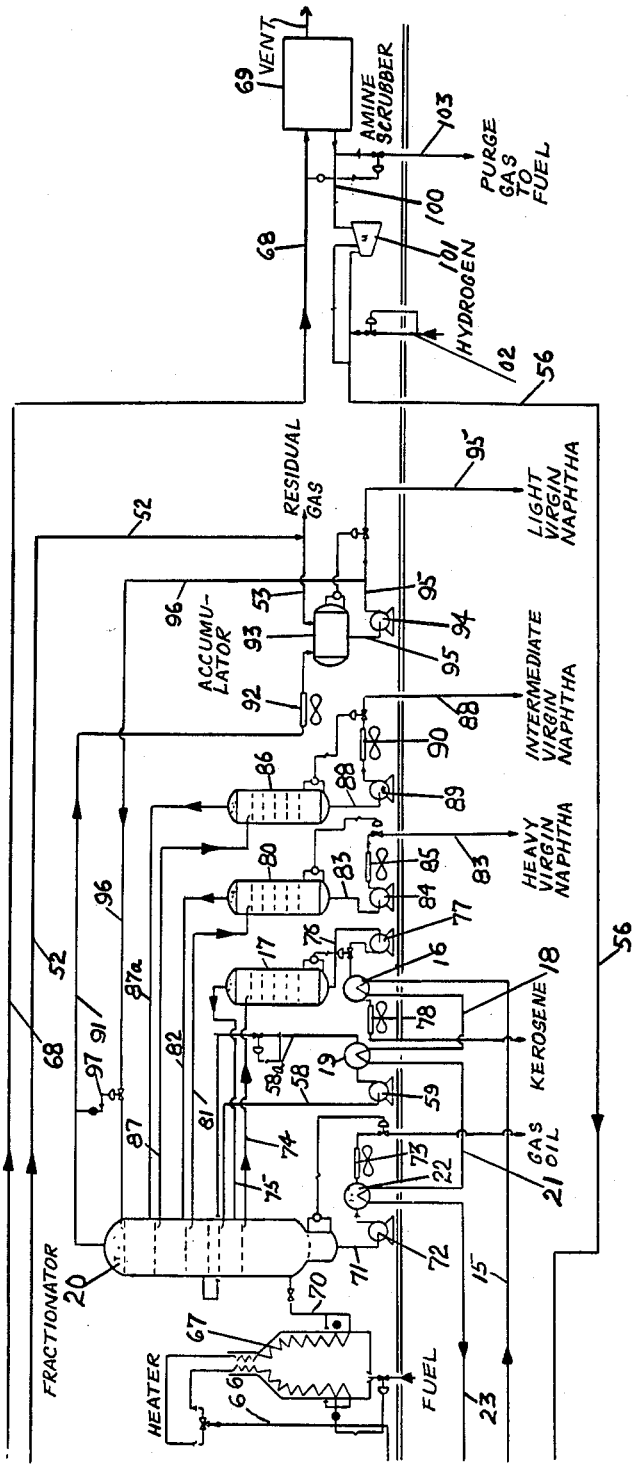

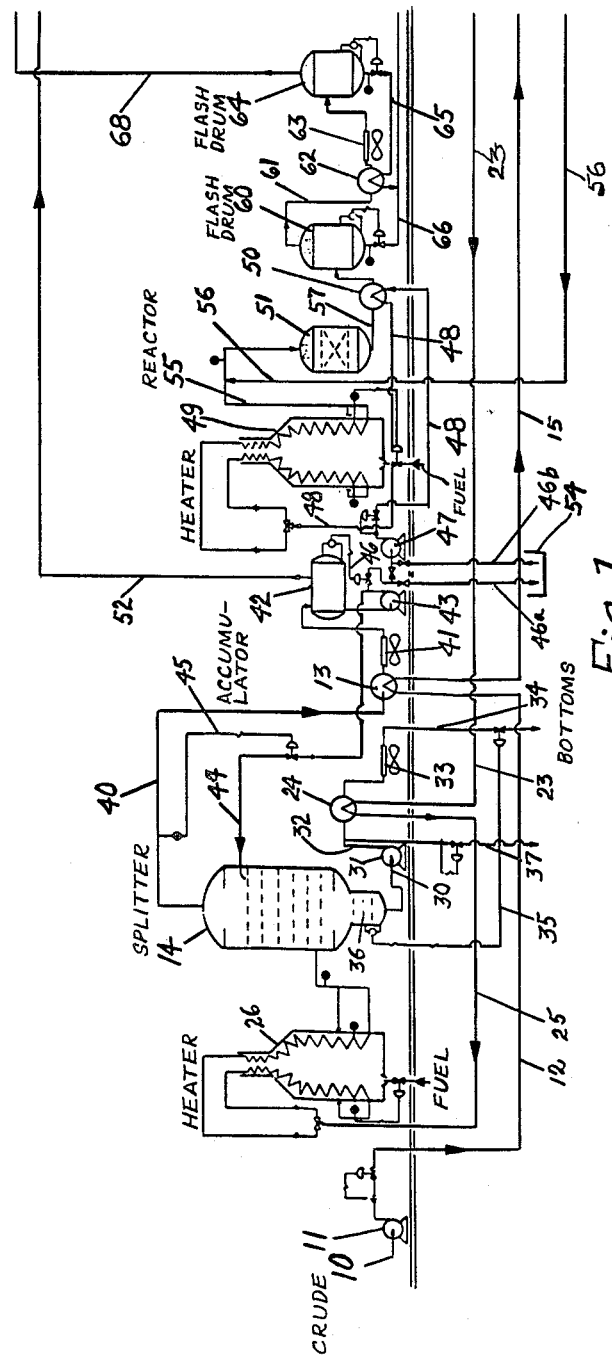

United States Patent Office 3,193,495
Patented July 6, 1965

3,193,495
DESULFURIZATION OF WIDE BOILING
RANGE CRUDES
James V. Ellor, Wilton, and George W. Ostberg, Cos
Cob, Conn., and John L. Disney, Valhalla, N.Y.,
assignors, by mesne assignments, to Esso Standard
Eastern, Inc.
Filed May 5, 1961, Ser. No. 108,167
6 Claims. (Cl. 208—211)

This invention relates generally to petroleum refining and more particularly to a process for distilling whole crude petroleum and removal of sulfur from a wide cut portion of the crude by a hydrodesulfurizing step, said wide cut portion of the crude including the naphtha, kerosene and up to and through the diesel oil fractions as a single cut.

Still more particularly, this invention relates to a process of refining whole crude petroleum wherein the sulfur contained in the wide cut portion is removed by a catalytic hydrodesulfurizing step, which step is carried out by utilizing hydrogen which is supplied from an outside source as distinguished from a process wherein hydrogen is introduced into the system in the form of hydrogen-donor fractions or distillates.

According to a prior known process of catalytic hydrodesulfurization, the hydrogen used to carry out the sulfur removal step is manufactured from the specific type of feed stock used in the distillation process; the hydrogen necessary for the sulfur removal reaction being manufactured from the specific type of feed stock used in the distillation process or from recycled hydrogen-donor distillate to provide the necessary naphthenic material to manufacture the hydrogen. That is, in that prior art process the hydrogen used in the sulfur removal step is not produced separately and independently from an outside source and introduced into the system in gaseous hydrogen form but the hydrogen is introduced in the form of a hydrogen-donor distillate or fraction to provide necessary naphthenic material to manufacture the hydrogen necessary for the sulfur removal reaction in situ in the catalytic reaction unit. In that process the hydrogen is obtained by dehydrogenation of naphthenes contained in the hydrogen-donor fractions. That type of process has been designated as "autofining."

In contrast, the process of this invention is one in which a wide cut fraction of the crude from which the sulfur is to be removed is treated by subjecting the stream of the wide cut fraction in vapor, liquid or mixed phase form to the action of hydrogen in suitable form in the presence of a catalyst in a suitable reactor vessel in which all or at least a substantial part of the hydrogen is supplied as hydrogen independently formed or furnished from an outside or independent source; the process of this invention being different and distinct from that process which has been designated as autofining. In the process according to this invention, the hydrogen is produced from an outside source; that is, it is produced independently by a hydroforming process which forms the hydrogen by reforming a hydrogen-containing stock by passing the stock through a hydrogen producing reformer containing a suitable catalyst or by other known ways of producing hydrogen ($H_2$).

Although there have been prior suggestions in the patented art of hydrodesulfurizing processes for sulfur removal both by treating separate conventionally produced narrow cut fractions and also by treating a fairly wide cut portion produced in a whole crude distillation process, those suggested or known hydrodesulfurization processes are wanting in various respects, especially where large commercial plant operations are involved or are contemplated.

This invention provides improvements in the heretofore known hydrodesulfurization processes, which improvements are admirably suited for commercial operations and plant operation where efficiency and control of the characteristics of the desired end products and reduced plant investment and operating costs are of the utmost importance.

According to this invention a continuous process is provided of hydrodesulfurizing a wide boiling range feed, cut from whole crude petroleum in the distillation process and containing naphtha, kerosene and diesel oil fractions as a single portion; the process comprising the steps of heating the crude petroleum feed; flashing the heated feed at roughly atmospheric pressure; condensing all of the resultant vapors of the diesel oil fraction and lighter fractions as a single portion; pumping the condensed single portion at high pressure through a preheat and furnace train, or zone, and thereby converting the single portion stream from all liquid to vapor and mixed vapor-liquid state at super-atmospheric pressure and passing the vaporized stream together with independently produced gaseous hydrogen directly to a hydrodesulfurizing zone in contact with a catalyst under super-atmospheric pressure, thereby causing the hydrogen to react with the surfur containing compounds of the vapors of the entire single portion, and thereby forming hydrogen sulfide; removing the hydrogen sulfide from the stream; then reducing the pressure to substantially atmospheric and fractionating the hydrodesulfurized product at this lowered pressure to separate desulfurized fractions having different predetermined boiling ranges.

Although the novel features which are believed to be characteristic of the invention will be pointed out in the annexed claims, the invention itself as to its objects and advantages and the manner in which it may be carried out may be better understood by reference to the following more detailed description taken in connection with the accompanying drawings forming a part hereof in which:

FIG. 1 and FIG. 1a when placed in juxtaposed position constitute a flow plan in diagrammatic form of a petroleum refining plant for illustrating the process of the invention. It is to be observed that when the right hand end of FIG. 1 is joined to the left hand end of FIG. 1a this provides a complete flow diagram. It will be understood that the plant is equipped with temperature and pressure indicators and pressure regulating valves and temperature regulating devices where needed, or desired.

Referring now to the flow diagram (FIG. 1), the liquid whole crude oil enters the system through line 10 connected to a suitable source (not shown). The crude charge may be any of the typical crude sulfur-containing feeds from which it is desired to remove sulfur such as, for example, domestic, Middle East and light South American. As a specific example the process of the invention may be described in connection with a whole Aramco crude having a typical inspection including sulfur content, as set forth in the following Table I.

Table I

| | |
|---|---|
| ° API gravity | 35.0 |
| Wt. percent sulfur | 1.9 |
| T.B.P. dist., LV percent off at: | |
| 200 | 10 |
| 300 | 20 |
| 400 | 30 |
| 500 | 40 |
| 600 | 50 |
| 700 | 60 |

The crude is forced by pump 11 through line 12 through heat exchanger 13 (where it is heated by an overhead stream from tower 14, later to be described) thence through line 15 through heat exchangers 16 (where it is further heated by the bottoms from tower 17, later to be described) thence through line 18 through heat exchanger 19 (where it is further heated by a liquid portion removed from fractionator tower 20, later to be described, this product being drawn through line 58 and pumped by pump 59 through heat exchanger 19 and returned to the tower through line 58a). The crude passes thence through line 21 through heat exchanger 22 (where it is further heated by bottoms from fractionator tower 20), thence through line 23 through heat exchanger 24 (where it is further heated by bottoms from splitter tower 14, later to be described) thence through line 25 into crude preheat furnace 26.

The crude is heated in the crude preheat furnace 26 to provide a constant flash zone temperature in the splitter tower 14 of from about 550° F. and 800° F.; and preferably a temperature at between 600° F. and 650° F. but more desirably 625° F. or close thereto. The crude is forced through the preheat furnace at a constant pressure to maintain a tower pressure in splitter tower 14 between 5 and 30 p.s.i.g. (pounds per square inch gauge); but preferably at 10 p.s.i.g. or very close thereto.

The bottom stream from the splitter tower 14 passes through line 30 and is forced by pump 31 through line 32 through heat exchanger 24 where it gives up heat to the crude stream flowing toward preheat furnace 26. The bottoms then pass through cooler 33, thence through line 34 to storage. Provision can be made to pass hot bottoms through line 37 to a pipe vacuum still for asphalt manufacture or to storage, if desired.

The overhead stream comprising vapors from splitter 14 pass through line 40 through heat exchanger 13 (where its heat is given up to the crude going to the furnace 26) thence through cooler 41 where the moving stream is cooled to between 150° F. and 200° F. and the stream is then passed into splitter accumulator 42. The apparatus is adjusted so that the liquid in the accumulator 42 comprises a wide boiling range fraction from the crude including naphtha, kerosene and up to and through the diesel oil fraction as a single cut. This wide boiling range fraction for convenience of description is herein referred to as a "wide cut" fraction.

A part of the condensed liquid from the overhead stream from splitter 14 is returned by pump 43 through line 44 to the splitter tower as reflux together with reflux condensed in line 45.

The stream of wide cut fraction accumulating as liquid in accumulator 42 is passed through line 46 and forced by pump 47 through line 48 through a second heating furnace 49 (herein referred to as the "first wide cut fraction preheating furnace"); it being noted that the stream first passes through a heat exchanger 50 where it takes up heat from the stream from the desulfurization reactor 51, later described. The pump 47 provides means to increase the pressure on the stream to any desired pressure above atmosphere and the furnace 49 provides means to heat the sulfur-containing wide cut fraction stream to any desired temperature for the subsquent catalytic reaction and sulfur removal step, later to be described. Uncondensed vapors and gases from accumulator 42 pass through line 52 to line 53 and thence to a low pressure burner or to such other use as may be desired. Provision is made to pump the liquid from accumulator 42 through lines 46a to a surge tank 54, if desired, and thence through line 46b to pump 47, for starting up the plant after a shutdown.

The heated wide cut stream is heated in heater 49 to a temperature between 500° F. and 800° F. and preferably to such temperature as will maintain a temperature in the desulfurizer catalytic reactor chamber 51 at between 600° F. and 700° F. and more desirably at about 650° F. The heater 49 is referred to herein, for convenience of description, as the "first wide cut fraction heater." Also the pressure in the reactor 51 is maintained at between 100 p.s.i.g. and 1000 p.s.i.g. and preferably between 400 p.s.i.g. and 500 p.s.i.g., and more desirably at about 440 p.s.i.g. The stream in vapor form is passed through line 55 into the reactor 51 and hydrogen is introduced into line 55 from an outside source (described later) through line 56.

The reactor unit 51 shown diagrammatically in the drawings comprises a reaction chamber containing cobalt molybdate as catalyst (or other known suitable material many be used as a catalyst). Such catalytic hydrodesulfurizing reaction units are known in the art and it is deemed unnecessary to describe this unit in further detail. And, of course, any number of units to be put into service alternately, could be provided in particular commercial installations.

The reactor effluent having been desulfurized in the catalytic desulfurizer unit 51 is passed through line 57 and heat exchanger 50 where it is cooled to 400° F. and thence into first flash drum 60 at a pressure of about 400 p.s.i.g. The overhead vapors from flash drum 60 pass through line 61 through heat exchanger 62, thence through cooler 63 into a second flash drum 64. The stream consisting of vapors and liquid is maintained at a temperature of about 100° F. and at a pressure of about 390 p.s.i.g. in flash drum 64. The bottoms from flash drum 64 are passed through line 65, through heat exchanger 62 where they take up heat from the overhead stream from flash drum 60 and are then combined with the bottoms from flash drum 60 and the combined bottoms are passed through line 66 through a preheat furnace 67, herein for convenience of description, referred to as the "second wide cut fraction heater." The vapors from flash drum 64 containing H$_2$S, light hydrocarbons, and possibly some unreacted H$_2$, and other gases not readily condensable pass through line 68 to an "amine" scrubber apparatus 69 where the stream is scrubbed with "amine" solution, such as dimethynolamine or diethynolamine for removal of H$_2$S. If desired, elemental sulfur may be recovered from the H$_2$S. The vapors from the amine scrubber 69 having the H$_2$S removed are compressed and recycled, as later described.

The combined bottoms from flash drums 60 and 64 comprises the wide cut fraction in liquid form from the whole crude which has now been desulfurized and has had removed therefrom residual uncondensed vapors and gases including residual H$_2$ and H$_2$S gases. It is passed through heater 67 and thence into fractionator tower 20. The wide cut fraction introduced to the fractionator tower may, for convenience of description, be referred to as the "desulfurized wide cut fraction" and will include the gas oil, kerosene, and naphtha fractions.

The temperature maintained in the heater 67 is such as to provide a flash zone temperature in fractionator tower 20 of between 400° F. and 650° F. and preferably a temperature between 550° F. and 625° F. and the fractions of the wide boiling range desulfurized single cut portion of the crude oil are separated into fractions of controlled narrower boiling range in the tower 20 at a pressure between atmospheric pressure and 100 p.s.i.g., and preferably between 5 p.s.i.g. and 60 p.s.i.g. The heated stream from furnace 67 passes through line 70 and the pressure on the stream is dropped so that downstream from tower 20 the pressure is maintained at substantially atmospheric pressure or slightly higher as mentioned above. The various desired fractions, such as light virgin naphtha, intermediate and heavy virgin naphthas (which may be catalytically reformed without requiring pretreating) and a kerosene fraction are produced as separate fractions, as later described.

It will be observed from the foregoing description that prior to the final fractionation of the wide cut fraction to produce the desired narrower boiling range fractions that the sulfur-containing wide cut fraction is treated in the catalytic hydrodesulfurizing unit under controlled conditions of high temperature and high pressure notwithstanding that this apparatus and step are an integral part of the whole crude refining plant and process, which operates as a continuous process from the beginning where the feed is whole crude to the refined separate end product fractions; and the final fractionating steps are carried out at conventional atmospheric pressures or at pressures only slightly higher than atmospheric.

Referring now in more detail to the distillation and fractionation steps for producing the more narrow boiling range fractions from the desulfurized wide cut fraction, this desulfurized wide cut fraction is introduced into fractionator tower 20 at a pressure between atmospheric pressure and 100 p.s.i.g. and preferably between 5 p.s.i.g. and 60 p.s.i.g. and at a temperature between 400° F. and 650° F. and preferably between 550° F. and 625° F. A gas oil fraction which may have a boiling range of 430° F.–630° F., is drawn off from the tower 20, as bottoms, through line 71 and pumped by pump 72 through heat exchanger 22 (where the hot bottoms give up heat to the countercurrent flowing whole crude passing through line 21) thence through cooler 73 to storage.

A kerosene fraction, which may have a boiling range of 330° F.–430° F., is drawn off as bottoms from stripper column 17 which is charged by a side stream line 74 from an appropriate tray in tower 20. Stripped vapors return from the stripper 17 to the tower 20 through vapor line 75. The stripper bottoms product, comprising the kerosene fraction, is drawn off through line 76 and pumped by pump 77 through heat exchanger 16 (where its heat is given up to the countercurrent flow of crude through line 15), thence through cooler 78 to storage or to a plant for treatment with $SO_2$ to improve its smoke point characteristics.

A heavy virgin naptha, which may have a boiling range of 300° F.–330° F., is drawn off as bottoms from stripper column 80 which is charged by a side stream line 81 from an appropriate tray in fractionator tower 20. Stripped vapors return from stripper 80 through vapor line 82 to the tower. The heavy virgin naphtha is drawn off from column 80 through line 83 and pumped by pump 84 through line 83 and pumped by pump 84 through cooler 85 and thence to storage or to a plant for use as feed stock for reforming.

An intermediate virgin naphtha, which may have a boiling range of 160° F.–300° F., is drawn off, as bottoms, from stripper column 86, which is charged by a side stream line 87 from an appropriate tray in fractionator tower 20. Stripped vapors return from stripper 86 to the tower through vapor line 87a. The intermediate virgin naphtha is drawn off from column 86 through line 88 and pumped by pump 89 through cooler 90 to storage or to a plant to be used as feed stock for a reformer.

The overhead vapors from fractionator tower 20 pass through line 91 through a cooler 92 and the condensed light virgin naphtha is accumulated in fractionator accumulator 93. Uncondensed vapors and gases pass from the accumulator 93 through line 53 and thence to a lower pressure burner or to such other use as may be desired. The light virgin naphtha, which may have a boiling range of 40° F.–160° F., is pumped from the accumulator 93 by pump 94 through line 95 to a stabilizer. So much of the light virgin naphtha as may be desired for reflux is returned through line 96 to the top of fractionator tower 20 together with condensate from line 97 which connects line 91 with line 96.

The sweet hydrocarbon vapors, residual $H_2$ and hydrogen-containing gases and other uncondensed gases are passed from the amine scrubber 69 through line 100 to a compressor 101 where they are compressed to a pressure sufficient to be forced through line 56 together with make-up hydrogen ($H_2$) forced through line 102 into line 56. Gas may be purged, as desired, from line 100 through line 103 to be used for fuel or such other purpose as may be desirable.

It is significant to note here that, although residual or unreacted hydrogen from scrubber apparatus 69 is recycled to the catalytic hydrodesulfurization unit 51, the hydrogen employed in the desulfurizing process is actually supplied from an outside source. This hydrogen ($H_2$) from an outside source may be produced in a known kind of hydrocarbon reformer (not shown) adapted to produce hydrogen-rich gas which is forced with recycled gas into the catalytic reactor 51 together with the sulfur-containing wide cut fraction from heater 49. The amount of hydrogen introduced into the moving stream, comprising the wide cut fraction from which the sulfur is to be removed, should be sufficient to bring about the necessary reaction in the hydrodesulfurization unit 51 to accomplish the desired sulfur removal. Approximately 1000 s.c.f (standard cubic feet) of hydrogen per barrel of charge is required in desulfurizing the wide cut fraction.

The following data (set forth in Table II) will serve to illustrate the effectiveness of the above described process for removal of sulfur from the sulfur-containing wide boiling range hydrocarbons which are cut from the whole crude as a single fraction. Inasmuch as the sulfur is removed at this stage of the refining process, it follows that there is corresponding sulfur decrease in the narrower boiling range products which are produced downstream after the stream leaves the hydrodesulfurizer unit. The sulfur removal reaction effected in the catalytic hydrodesulfurizer unit is an integral part of the refining process carried out on a continuously moving stream.

The following Table II shows results based on a charge stock comprising Aramco crude of the kind set forth in the above Table I.

*Table II*

| Product | API° Gravity | Boiling Range ° F. | | Percent S By Wt. |
|---|---|---|---|---|
| | | I.B.P. | F.B.P. | |
| Crude Charge | 35.0 | | | 1.9 |
| Wide Cut Fraction Prior to Entering Catalytic Reactor | | 40 | 630 | 0.66 |
| Wide Cut Fraction After Desulfurization: | | | | |
| Gas Oil Fraction | | 430 | 630 | |
| Kerosene Fraction | | 330 | 430 | 0.0012 |
| Heavy Virgin Naphtha | | 300 | 330 | 0.0006 |
| Intermediate Virgin Naptha | | 160 | 300 | 0.0004 |
| Light Virgin Naphtha | | 40 | 160 | 0.0002 |

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for hydrodesulfurizing a wide boiling crude petroleum oil feed containing naphtha, kerosene and diesel oil fractions which comprises the steps of heating a continuous stream of the crude oil feed to a temperature sufficient to flash off the diesel oil and lighter fractions stream; flashing the heated feed at a pressure between atmospheric and 30 p.s.i.g.; condensing all of the resulting vapors of the diesel oil and lighter fractions and cooling to a temperature below 200° F., thereby to form a continuous wide cut liquid fraction stream containing the diesel oil fraction and all lighter fractions of the crude oil; removing uncondensed gases therefrom; passing the wide cut fraction as a continuous stream through a preheat zone at a higher pressure between 100 and 1000 p.s.i.g. and heating it sufficiently to vaporize said wide cut fraction under the said higher pressure; passing said vaporized wide cut fraction stream together with independently produced gaseous hydrogen directly as a continuous stream to a hydrodesulfurizing zone; hydrodesulfurizing the total vapors of said continous wide cut fraction stream under hydrodesulfurizing conditions at a temperature between 600° F. and 700° F. and at a pressure between 400 p.s.i.g. and 500 p.s.i.g. and thereby removing sulfur from said wide cut fraction; thereafter fractionating the cut fraction stream at substantially lower pressure to produce separate products of narrower boiling ranges.

2. A process as defined in claim 1 in which the wide cut fraction stream after leaving said hydrodesulfurization zone is cooled to below about 100° F. and the pressure on said stream is reduced but maintained at about 390 p.s.i.g. and residual unreacted hydrogen then present is removed, and the wide cut fraction stream after removal of said unreacted residual hydrogen is heated to between 400° F. and 650° F. and then fractionated at a pressure between 0 p.s.i.g. and 100 p.s.i.g.

3. A process as defined in claim 2 in which the wide cut fraction stream after removal of unreacted residual hydrogen is heated to between 550° F and 625° F. and fractionated at a pressure between 5 p.s.i.g. and 60 p.s.i.g.

4. In a continuous process of refining whole crude petroleum containing unwanted sulfur wherein a wide cut fraction, including naphtha, kerosene and diesel oil fractions, is subjected to a catalytic hydrodesulfurization and the hydrogen for said catalytic reaction is independently and separately produced from an outside source, the steps which comprise heating a continuous stream of whole crude oil feed to a temperature sufficient to flash off the diesel oil fraction and lighter fractions of the crude; flashing the heated crude stream at a pressure between atmospheric and 30 p.s.i.g., condensing all the resulting vapors of the diesel oil and lighter fractions, thereby producing a wide cut liquid fraction containing the diesel and all lighter fractions of the crude oil feed, passing the wide cut fraction as a continuous stream through a first preheat zone at superatmospheric pressure between 100 and 1000 p.s.i.g. and heating it sufficiently to vaporize said wide fraction under said superatmospheric pressure, and after said stream has passed through said first preheat zone introducing into said preheated stream hydrogen gas which has been produced from an outside source, passing said preheated wide cut fraction stream together with said gaseous hydrogen into a catalytic hydrodesulfurizing zone, while maintaining the pressure in said zone between 100 and 1000 p.s.i.g. and a tempearture between 600° F. and 700° F., thereby removing sulfur from said wide cut fraction, then cooling said wide cut fraction stream and removing residual uncondensed gases including unreacted hydrogen from the stream, then passing said wide cut fraction as a continuous stream through a second preheat zone and heating it sufficiently to fractionate said wide cut stream to produce separate products of predetermined narrower boiling range.

5. In a process of refining whole crude petroleum containing unwanted sulfur wherein a wide cut fraction including naphtha, kerosene and diesel oil fractions is subjected to a catalytic hydrodesulfurization and the hydrogen for said reaction is independently and separately produced from an outside source, the steps which comprise heating a continuous stream of whole crude oil feed to a temperature sufficiently high to flash off the diesel oil fraction and lighter fractions of the crude oil feed; flashing the heated crude stream at a pressure between atmospheric and 30 p.s.i.g. and at a temperature to vaporize the crude through the diesel oil fraction, condensing all the resulting vapors of the diesel oil and lighter fractions, thereby producing a wide cut liquid fraction containing the diesel and all lighter fractions of the crude oil feed, passing the wide cut fraction as a continuous stream through a first preheat zone at a pressure between 100 p.s.i.g. and 1000 p.s.i.g. and heating it to a temperature between 500° F. and 800° F sufficiently to vaporize said wide cut fraction under the superatmospheric pressure, and after said stream has passed through said first preheat zone introducing into said preheated stream hydrogen gas which has been produced from an outside source, passing said preheated wide cut fraction stream together with said gaseous hydrogen into a catalytic hydrodesulfurizing zone, while maintaining the pressure in said zone between 400 p.s.i.g. and 500 p.s.i.g. and at a temperature between 600° F. and 700° F., thereby removing sulfur from said wide cut fraction, then cooling said wide cut fraction stream to a temperature below about 100° F. and removing residual uncondensed gases including unreacted hydrogen therefrom, then passing said wide cut fraction as a continuous stream through a second preheat zone and heating it therein to a temperature between 400° F. and 600° F. and fractionating said wide cut stream in a fractionator maintained at a pressure between 5 p.s.i.g. and 60 p.s.i.g. to produce from said wide cut desulfurized fraction separate products of predetermined narrower boiling range.

6. A process as defined in claim 5 in which the pressure on said stream including the hydrogen in said hydrodesulfurizing zone is maintained at about 440 p.s.i.g. and the temperature at about 650° F. and the amount of hydrogen introduced into said stream is about 1000 s.c.f. per barrel of wide cut fraction and the temperature of the stream after it leaves said catalytic hydrodesulfurizing zone is reduced to below 100° F. and its pressure to about 390 p.s.i.g. and the cooled wide cut fraction is then passed through a second preheat zone where it is heated to between 550° F. and 625° F. and in which the desulfurized wide cut fraction is fractionated in said fractionator to produce a light virgin naphtha, an intermediate virgin naphtha, a heavy virgin naphtha, a kerosene and a gas oil fraction.

References Cited by the Examiner

UNITED STATES PATENTS 2,959,538  11/60  Weikart et al. _____ 208—211
2,998,381  8/61  Bushnell _____ 208—210

ALPHONSO D. SULLIVAN, *Primary Examiner.*

UNITED STATES PATENT OFFICE
CERTIFICATE OF CORRECTION

Patent No. 3,193,498                  July 6, 1965

Roger Platzer et al.

It is hereby certified that error appears in the above numbered patent requiring correction and that the said Letters Patent should read as corrected below.

Column 4, line 9, for "exchangers" read -- exchange material --; column 9, line 70, for "elongaed" read -- elongated --; column 10, line 38, after "liquid" insert -- flow --.

Signed and sealed this 22nd day of February 1966.

(SEAL)
Attest:

ERNEST W. SWIDER                  EDWARD J. BRENNER
Attesting Officer                         Commissioner of Patents